(12) United States Patent
Hung et al.

(10) Patent No.: US 9,141,141 B2
(45) Date of Patent: Sep. 22, 2015

(54) PORTABLE DEVICE AND PERIPHERAL EXTENSION DOCK

(71) Applicant: HTC Corporation, Taoyuan (TW)

(72) Inventors: Ching-Chung Hung, Taoyuan (TW); Yu-Peng Lai, Taoyuan (TW); Wei-Chih Chang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/581,732

(22) Filed: Dec. 23, 2014

(65) Prior Publication Data

US 2015/0109727 A1     Apr. 23, 2015

Related U.S. Application Data

(62) Division of application No. 13/489,027, filed on Jun. 5, 2012, now Pat. No. 8,954,628.

(51) Int. Cl.
| | |
|---|---|
| *G06F 3/00* | (2006.01) |
| *G06F 13/12* | (2006.01) |
| *G06F 1/16* | (2006.01) |
| *G06F 13/40* | (2006.01) |

(52) U.S. Cl.
CPC .......... *G06F 1/1632* (2013.01); *G06F 13/4081* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | |
|---|---|---|
| 5,978,927 A | 11/1999 | Curry et al. |
| 8,151,018 B2 | 4/2012 | Mohanty et al. |
| 2009/0024764 A1 | 1/2009 | Atherton et al. |

FOREIGN PATENT DOCUMENTS

TW     201104429 A1    2/2011

*Primary Examiner* — Idriss N Alrobaye
*Assistant Examiner* — David Martinez
(74) *Attorney, Agent, or Firm* — Birch, Stewart, Kolasch & Birch, LLP

(57) ABSTRACT

An electronic device includes a housing, a connector port embedded in the housing for a peripheral device inserted therein and a switching device. The processor is electrically connected to the connector port and includes a detection pin and a 1-wire pin. The switching device is coupled between the connector port and the processor to selectively connect the connector port to one of the detection pin or the 1-wire pin. When the peripheral device is inserted into the connector port, the processor controls the switching device to connect the connector port to the detection pin to determine whether the connected peripheral device is a 1-wire device. When the processor determines that the connected peripheral device is a 1-wire device, the processor controls the switching device to connect the connector port to the 1-wire pin and the processor executes 1-wire communication with the peripheral device via the 1-wire pin.

7 Claims, 6 Drawing Sheets

PORTABLE DEVICE AND PERIPHERAL EXTENSION DOCK

CROSS-REFERENCES TO RELATED APPLICATIONS

This application is a Divisional of co-pending application Ser. No. 13/489,027, filed on Jun. 5, 2012, the entire contents of which are hereby incorporated by reference and for which priority is claimed under 35 U.S.C. §120.

BACKGROUND OF THE INVENTION

1. Field of the Invention

The invention relates to a communication method between an electronic device and a peripheral device, and more particularly to a communication method between an electronic device and a 1-wire peripheral device.

2. Description of the Related Art

Portable devices, such as smart phones, tablets or personal digital assistants, have become necessities in business or for personal usage. To increase the functionality of portable devices, lots of peripheral devices have been developed for the portable devices. Furthermore, to decrease the number of types of connectors of the portable devices and the complexity of the bus, a 1-wire bus has therefore been adopted. The 1-wire bus is a simple bus having only one transmission line, where control and communication can be implemented. The number of Input/output ports can be saved and the system design of portable devices can be made simpler, thus, reducing hardware costs for manufacturing. However, even if portable devices do not connect to a 1-wire device, the portable device still must poll the 1-wire bus. Thus, power consumption is increased, affecting limited battery power, thereby decreasing the usage time of the portable device.

BRIEF SUMMARY OF THE INVENTION

An embodiment of the invention provides an electronic device comprising a housing, a connector port and a switching device. The connector port is embedded in the housing for a peripheral device inserted therein to electrically connect thereto. The processor is electrically connected to the connector port and comprises a detection pin and a 1-wire pin. The switching device is coupled between the connector port and the processor to selectively connect the connector port to one of the detection pin or the 1-wire pin. When the peripheral device is inserted into the connector port, the processor controls the switching device to connect the connector port to the detection pin to determine whether the connected peripheral device is a 1-wire device. When the processor determines that the connected peripheral device is a 1-wire device, the processor controls the switching device to connect the connector port to the 1-wire pin and the processor executes 1-wire communication with the peripheral device via the 1-wire pin.

Another embodiment of the invention provides an electronic device electrically connected to an extension device to generate a 1-wire data path and an interrupt path. The extension electrically connects to at least one peripheral device. The electronic device comprises a housing, a connector port, a processor and a switching device. The connector port is embedded in the housing which electrically connects to the extension device and to the peripheral device connected to the extension device, wherein when the peripheral device is connected to or removed from the extension device, an interrupt signal is transmitted to the connector port. The processor is electrically connected to the connector port and comprises a detection pin, a 1-wire pin and an interrupt pin, wherein the interrupt pin is connected to the interrupt path via the connector port to receive the interrupt signal. The switching device is coupled between the connector port and the processor to selectively connect the 1-wire data path to one of the detection pin or the 1-wire pin. When the processor receives the interrupt signal via the interrupt pin, the switching device connects the 1-wire pin to the 1-wire data path, and the processor scans the peripheral device via the 1-wire path to acquire a status of the peripheral device.

Another embodiment of the invention provides an extension device coupled to an electronic device. The extension device comprises a first connector, a second connector and a controller. The first connector connects to a 1-wire peripheral device, wherein the first connector comprises a first detection pin and a first 1-wire pin. The second connector connects to a peripheral device, wherein the second connector comprises a second detection pin and a second 1-wire pin. The controller comprises a first interrupt pin coupled to the first detection pin, a second interrupt pin coupled to the second detection pin and an output pin. When a logic state of the first interrupt pin or the second interrupt pin changes, an interrupt signal is output to the electronic device via the output pin, and an electrical connection between the electronic device and the 1-wire peripheral device or the peripheral device is established.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
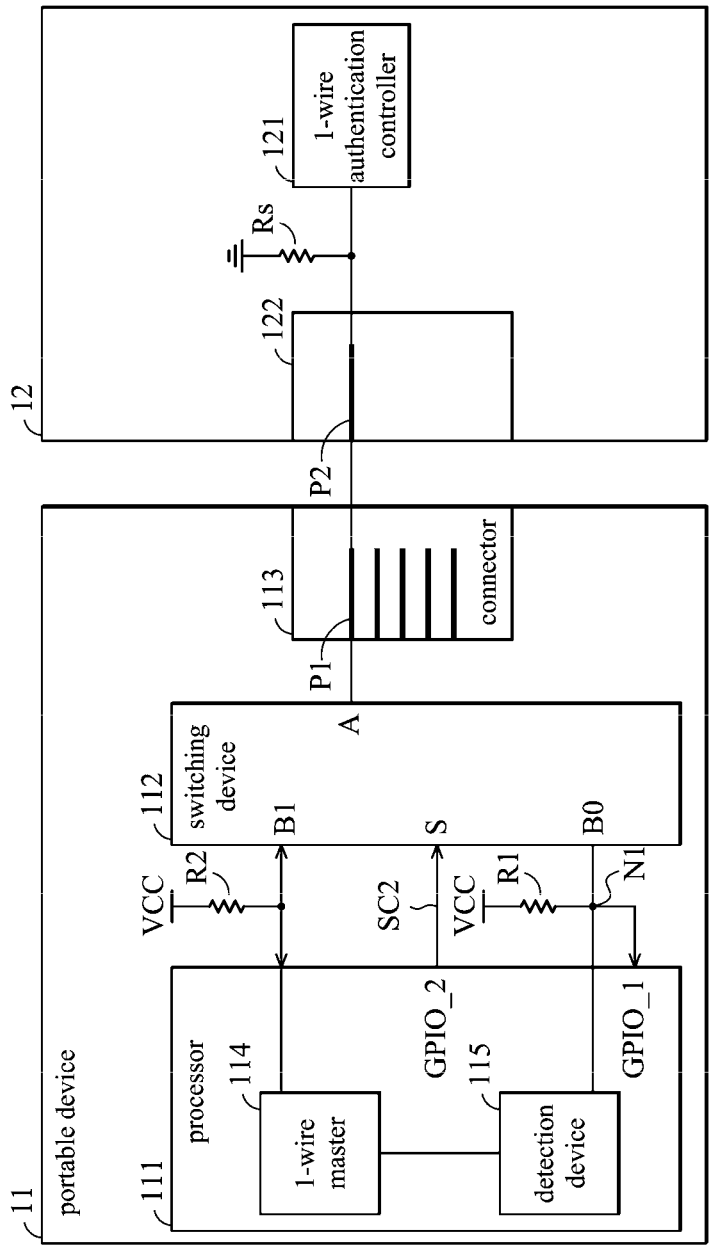
FIG. 1 is a schematic diagram of an embodiment of a portable device according to the invention.

FIG. 1 is a schematic diagram of an embodiment of a portable device according to the invention. The portable device 11 comprises a housing, wherein the processor 111 and the switching device 112 are embedded inside of the housing, and a connector 113 is embedded in the housing for connection to external devices. The portable device 11 connects to a connector 122 of the peripheral device 12 via the connector 113. In this embodiment, the connector 113 is a micro USB connector. The micro USB connector comprises 5 pins, wherein an identification pin (the pin P1 in FIG. 1) is used only for the USB On-The-Go standard, and does not work at normal situation. Thus, the pin P1 can be assigned for 1-wire communication. The switching device 112 establishes a connection between the processor 111 and the peripheral device 12. The switching device 112 establishes a connection between a terminal A and a terminal B0 or a connection between the terminal A and a terminal B1 according to a select signal which is output by the processor 111 via the second general purpose input/output pin (GPIO_2). The second general purpose input/output pin (GPIO_2) is coupled to a terminal S of the switching device 112. In a default situation or a predetermined situation, the switching device 112 establishes the connection between the terminal A and the terminal B0. In one embodiment of the invention, the switching device 112 is a multiplexer.

A first general purpose input/output pin (GPIO_1) of the processor 111 is coupled to the terminal B0 of the switching device 112, and a first resistor R1 is coupled between the terminal N1 and the voltage Vcc. The pin P2 of the connector 122 is coupled to a 1-wire authentication controller 121 and coupled to ground via a resistor Rs. In this embodiment, the resistance of the first resistor R1 is substantially 100 k ohm, and the resistance of the resistor Rs is substantially 15 k ohm. When the peripheral device 12 connects to the portable device 11, the voltage of the node N1 is pulled down to a low voltage level. The processor 111 detects the voltage change via the pin GPIO_1, and an interrupt signal is trigged to inform the portable device 11 that a peripheral device is connected thereto. The detection device 115 detects the voltage of the node N1 and determines whether the peripheral device 12 is a 1-wire peripheral device. In this embodiment, if the peripheral device 12 is a 1-wire device, the resistance of the resistor Rs is 15K ohm. Thus, the detection device 115 determines the resistance of the resistor Rs according to the voltage level of the node N1 and determines whether the peripheral device 12 is the 1-wire device according to the resistance of the resistor Rs.

When the peripheral device 12 is determined as a 1-wire device, the processor 111 transmits a select signal to the switching device 112 to establish the connection between the node A and node B1. Then, a 1-wire master 114 of the processor 111 and a 1-wire authentication controller 121 execute 1-wire communication. After the 1-wire communication is finished or completed, the processor 111 informs the switching device 112 to establish the connection between the node A and node B0. In this embodiment, the 1-wire master may be a specific circuit, a functional element, a program executed by the processor 111 or a logic circuit that is generated by transforming the program executed by the processor 111 via a specific program. In this embodiment, the processor 111 controls the switching device 112 by controlling the logic level of the pin GPIO_2. For example, when the logic level of the pin GPIO_2 is 0, the switching device 112 establishes the connection between the node A and B0, and when the logic level of the pin GPIO_2 is 1, the switching device 112 establishes the connection between the node A and B1.

Figure 2:
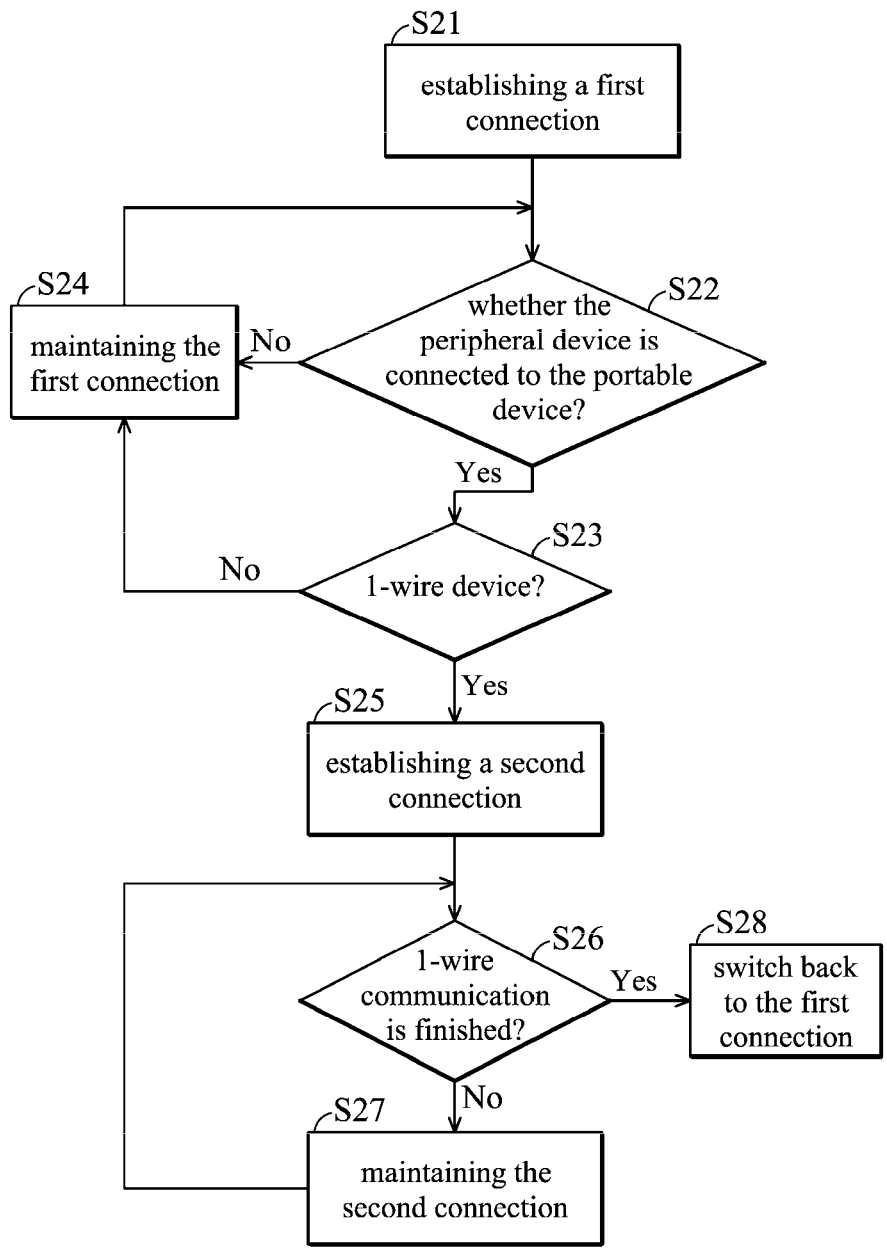
FIG. 2 is a flow chart of a detection and communication method for a peripheral device according to an embodiment of the invention.

FIG. 2 is a flow chart of a detection and communication method for a peripheral device according to an embodiment of the invention. The method of the embodiment reduces the power consumption of the portable device having 1-wire communication. The conventional portable device continuously polls the peripheral device to check whether a 1-wire peripheral device is connected thereto. The method of the embodiment executes 1-wire communication only when a 1-wire peripheral device is detected. In the step S21, a first connection, such as the connection between the nodes A and B0, is established. Simply speaking, the first connection is a connection between a detector or a detection device of the portable device and a connector of the portable device. In the step S22, the portable device determines whether the peripheral device is connected to the portable device. In this embodiment, if the peripheral device is connected to the portable device, an interrupt signal is transmitted to a processor of the portable device. For example, the detector is connected to a pin of the connector, and when the peripheral device is connected to the portable device, a voltage level of the pin may be changed to a low voltage level or a high voltage level, and the interrupt signal is generated accordingly. The interrupt signal informs the processor of the portable device that the peripheral device is connected to the portable device. If no peripheral device is connected to the portable device, the step S24 is executed and the first connection is maintained.

In the step S23, the detection device of the portable determines whether the connected peripheral device is a 1-wire peripheral device. If yes, the step S25 is executed. In the step S25, the first connection is cut, and a second connection, such as the connection between the node A and node B1 of FIG. 1, is established. Simply speaking, the second connection is the connection between a 1-wire controller of the portable device and the connector of the portable device. The second connection is used to execute 1-wire communication with a 1-wire authentication controller of the peripheral device. When the 1-wire controller finishes the 1-wire communication with the 1-wire authentication controller, a select signal is transmitted to a switching device to cut the second connection and establish the first connection. In the step S26, the portable device determines whether the 1-wire communication is finished. If not, the step S27 is executed and the second connection is maintained. If the 1-wire communication is finished, the step S28 is executed to cut the second connection and establish the first connection.

Figure 3:
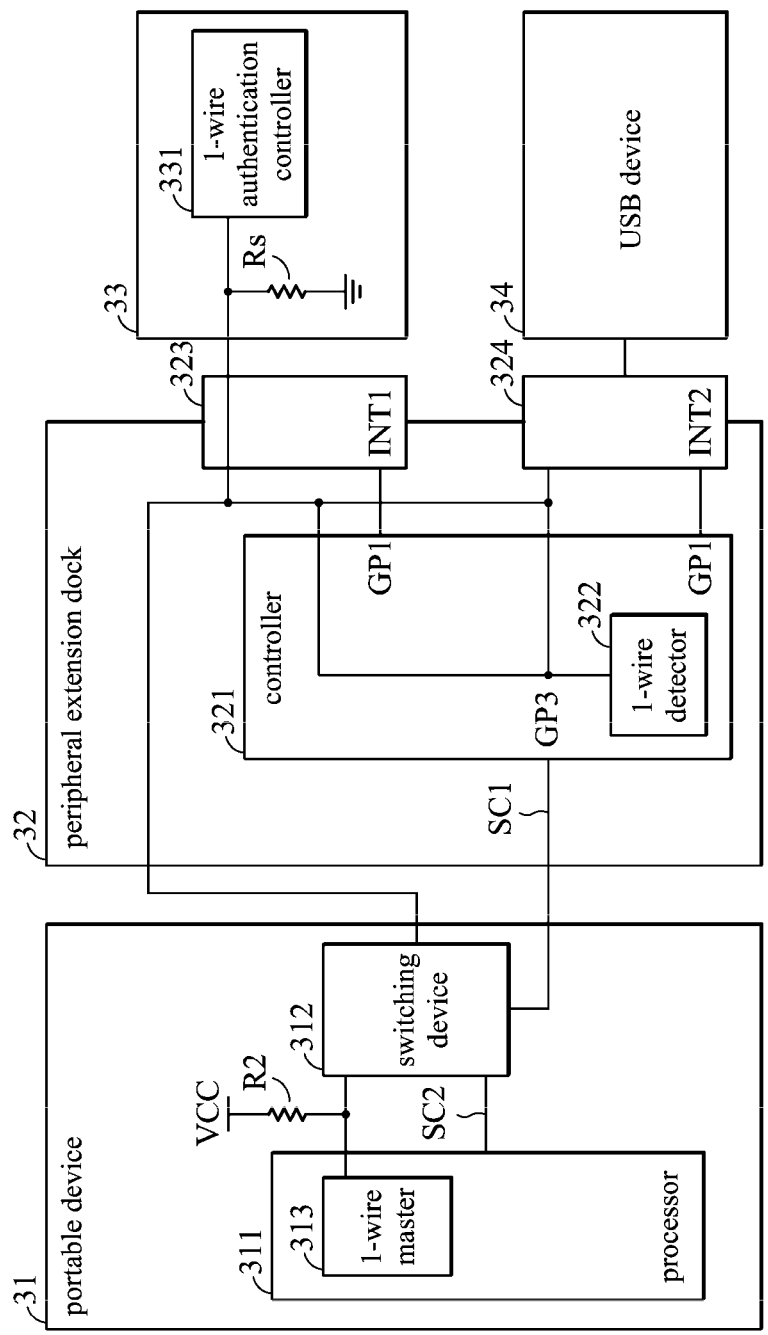
FIG. 3 is a schematic diagram of an embodiment of a peripheral extension dock according to the invention.

FIG. 3 is a schematic diagram of an embodiment of a peripheral extension dock according to the invention. The peripheral extension dock 32 comprises a first connector 323 and a second connector 324, wherein each connector comprises a 1-wire pin and a detection pin. The detection pin of the first connector 323 connects to the pin GP1 of the controller 321 and the detection pin of the second connector 324 connects to the pin GP2 of the controller 321. When a peripheral device connects to the first connector 323 or the second connector 324, the voltage level of the pin GP1 or GP2 may be changed to a ground voltage level or a high voltage level, and the controller 321 knows that the peripheral device connects to the peripheral extension dock 32 accordingly. In FIG. 3, a 1-wire device 33 is connected to the first connector 323 and a USB device 34 is connected to the second connector 324. Since the USB device 34 does not support the 1-wire communication, the 1-wire pin of the second connector 323 does not work. In this embodiment, the first connector 323 and the second connector 324 are micro USB connectors and the identification pin of the micro USB connector serves as the 1-wire pin.

The peripheral extension dock 32 is connected to the portable device 31 and serves as a 1-wire communication medium between the portable device 31 and the peripheral device. Each the first connector 323 and the second connector 324 comprise a 1-wire pin coupled to a 1-wire detector 322 of the controller 321. The 1-wire detector 322 determines whether the peripheral device connected to the first connector 323 or the second connector 324 is a 1-wire device. If yes, the controller 321 transmits a control signal SC1 to the switching device 312 via the pin GP3. When the peripheral device is connected to the peripheral extension dock 32 or removed from the peripheral extension dock 32, the peripheral extension dock 32 detects all connected peripheral devices to determine whether the current connected peripheral devices comprise a 1-wire device. If a 1-wire device is detected, the controller 321 transmits the control signal SC1 to the switching device 312 via the pin GP3. For the operation of the 1-wire detector 322, reference can be made to the description of the detection device 115, and will not be described here for brevity. The peripheral extension dock 32 connects the 1-wire pin of the first connector 323 with the 1-wire pin of the second connector 324, and the 1-wire pins are then electrically connected to the switching device 312 of the portable device 31. When the switching device 312 receives the control signal SC1, the switching device 312 is turned on, and the 1-wire master 313 of the processor 311 is then connected to the 1-wire pin of the first connector 323 and the second connector 324. The 1-wire master 313 sequentially executes the 1-wire communication with the peripheral devices. If the peripheral device is not a 1-wire peripheral device, the peripheral device will not respond to the signal, data or a request transmitted by the 1-wire master 313. After the 1-wire master 313 communicates with all of the connected peripheral devices, a control signal SC2 is transmitted to the switching device 312 to turn off the switching device 312.

Figure 4:
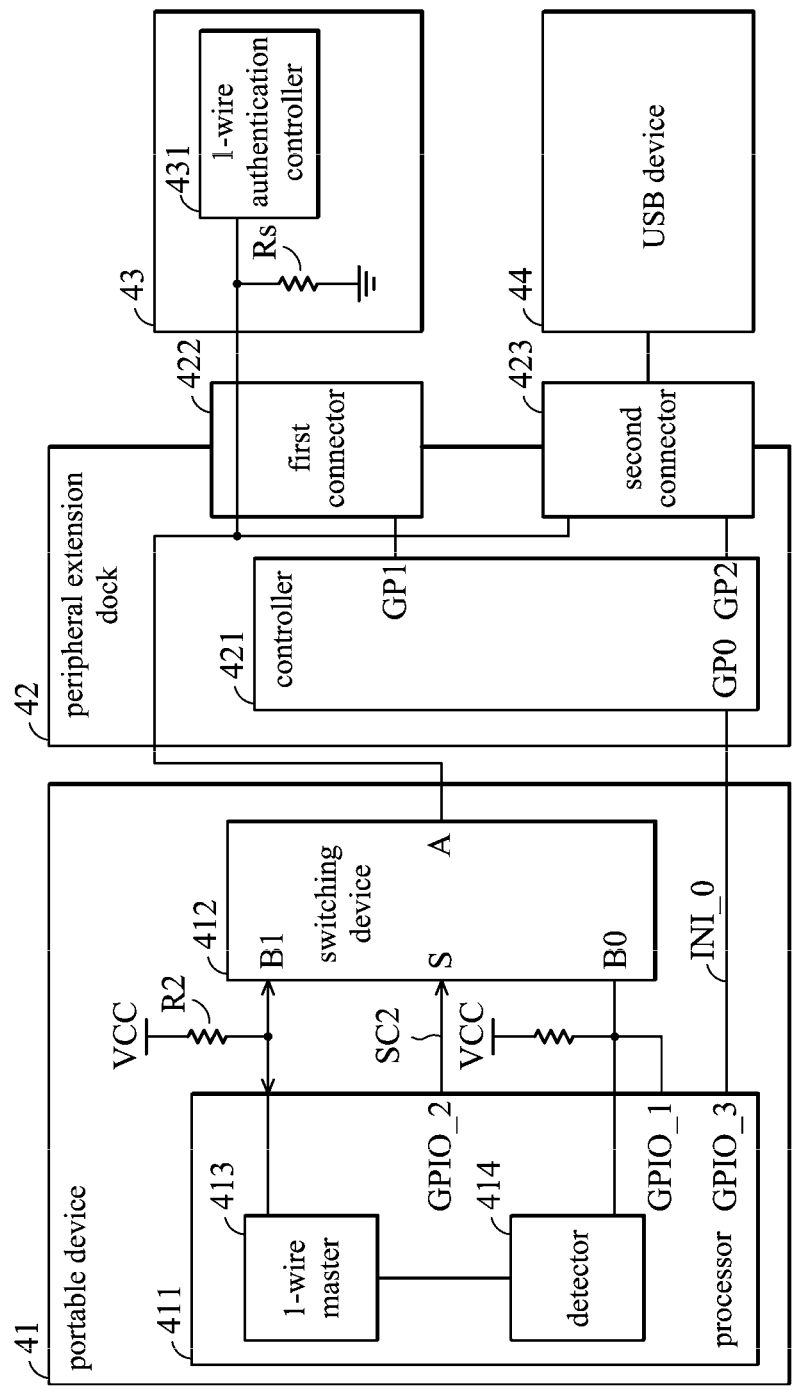
FIG. 4 is a schematic diagram of an embodiment of a peripheral extension dock according to the invention.

FIG. 4 is a schematic diagram of an embodiment of a peripheral extension dock according to the invention. The peripheral extension dock 42 comprises a first connector 422 and a second connector 423, wherein each connector comprises a 1-wire pin and a detection pin. The detection pin of the first connector 422 is coupled to the pin GP1 of the controller 421 and the detection pin of the second connector 423 is coupled to the pin GP2 of the controller 421. When a peripheral device connects to the first connector 422 or the second connector 423, the voltage level of pin GP1 or GP2 is changed to a ground voltage level or a high voltage level and the controller 421 determines that there is at least one peripheral connected to the peripheral extension dock 42, accordingly. In FIG. 4, the first connector 422 connects to a 1-wire device 43 and the second connector 423 connects to a USB device 44. Since the USB device 44 does not support the 1-wire communication, the 1-wire pin of the second connector 423 does not work. In this embodiment, the first connector 422 and the second connector 423 are micro USB connectors and the identification pin of the micro USB connector serves as the 1-wire pin.

When a peripheral device is connected to the peripheral extension dock 42 or removed from the peripheral extension dock 42, the peripheral extension dock 42 transmits an interrupt signal to the pin GPIO_3 of the processor 411. The portable device 41 comprises a processor 411 and a switching device 412. The switching device 412 establishes the connection between the processor 411 and the peripheral extension dock 42. The switching device 412 establishes the connection between the node A and node B0 or the node A and the node B1 according to a select signal transmitted from the pin GPIO_2 by the processor 411. The pin GPIO_2 is coupled to the terminal S of the switching device 412. In a default condition, the switching device 412 is pre-set to establish the connection between the node A and the node B0. In one embodiment of the invention, the switching device 412 is a multiplexer.

When the processor 411 receives the interrupt signal transmitted by the peripheral extension dock 42, the detector 414 detects whether the peripheral devices connected to the peripheral extension dock 42 comprise a 1-wire device. The detector 414 detects the voltage level of the node B0 to determine whether there is a 1-wire device connected to the peripheral extension dock 42. In this embodiment, if the peripheral device is a 1-wire device, the pin of the 1-wire device connected to the 1-wire pin of the connector is coupled to a resistor Rs, and the resistance of the resistor Rs is substantially 15 k ohm. In this embodiment, when the 1-wire device 43 is electrically connected to the detector 414, the voltage level of the node B0 is pulled down. Thus, the detector 414 can estimate the resistance of the resistor Rs according to the voltage level of the node B0. If the estimated resistance is substantially equal to 15 k ohm, the peripheral device connected to the peripheral extension dock 42 is a 1-wire device.

When the detector 414 detects that at least one 1-wire device is connected to the peripheral extension dock 42, the processor 411 transmits a select signal to the switching device 412 to establish the connection between the node A and the node B2. The 1-wire master 413 and the 1-wire authentication controller 431 then execute 1-wire communication. The 1-wire master 413 sequentially executes the 1-wire communication with the peripheral devices connected to the peripheral extension dock 42. If the peripheral device is not a 1-wire peripheral device, the peripheral device will not respond to the signal, data or a request transmitted by the 1-wire master 413. After the 1-wire master 413 communicates with all of the connected peripheral devices, the 1-wire master 413 stores a status data of the peripheral devices currently connected to the peripheral extension dock 42. The status data may comprise identification information of the connector, a data indicating whether the connected peripheral device is a 1-wire device, the type of the 1-wire device and the identification of the 1-wire device.

In this embodiment, the portable device 41 further comprises a storage device to store a plurality of codes. After the 1-wire communication, the 1-wire master 413 compares the received identification information with the plurality of codes to identify the peripheral devices.

After the 1-wire communication, the processor 411 informs the switching device 412 to establish the connection between the node A and the node B0. In this embodiment, the 1-wire master 413 may be a specific circuit inside the processor, a functional element, a program executed by the processor 411 or a logic circuit that is generated by transforming the program executed by the processor 411 via a specific program. In this embodiment, the processor 411 controls the switching device 413 by controlling the logic level of the pin GPIO_2. When the logic level of the pin GPIO_2 is 0, the switching device 412 establishes the connection between the node A and the node B0. When the logic level of the pin GPIO_2 is 1, the switching device 412 establishes the connection between the node A and the node B1.

In this embodiment, when a peripheral device is connected to the peripheral extension dock 42 or removed from the peripheral extension dock 42, the peripheral extension dock 42 transmits an interrupt signal INT_O to the processor 411 and the detector 414 detects whether the peripheral devices connected to the peripheral extension dock 42 comprises a 1-wire device. When the detector 414 detects that at least one 1-wire device is connected to the peripheral extension dock 42, the processor 411 transmits a select signal to the switching device 412 to establish the connection between the node A and the node B1. Then, the 1-wire master 413 repeats the described operations, which are not discussed here for brevity.

Figure 5:
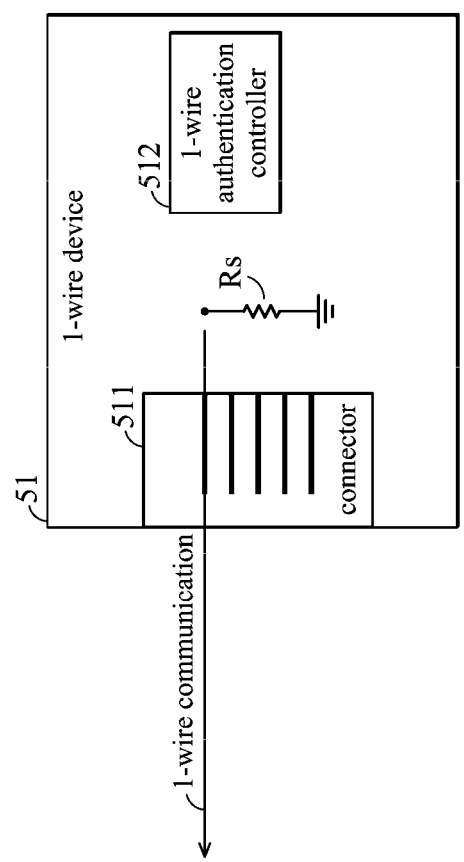
FIG. 5 is a schematic diagram of a 1-wire device according to an embodiment of the invention.

FIG. 5 is a schematic diagram of a 1-wire device according to an embodiment of the invention. The 1-wire device 51 comprises a connector 511 and a 1-wire authentication controller 512. A pin of the connector 511 is grounded via a resistor Rs, wherein the resistance of the resistor Rs is substantially equal to 15 k ohm. When the 1-wire device is connected to the electronic device with the 1-wire communication function, an interrupt is generated because of the resistor Rs to inform the electronic device that the 1-wire device 51 has connected thereto. Then, the 1-wire authentication controller 512 executes 1-wire communication with the electronic device. After the 1-wire communication, the 1-wire authentication controller 512 outputs a control signal to the electronic device to interrupt the 1-wire communication.

Figure 6:
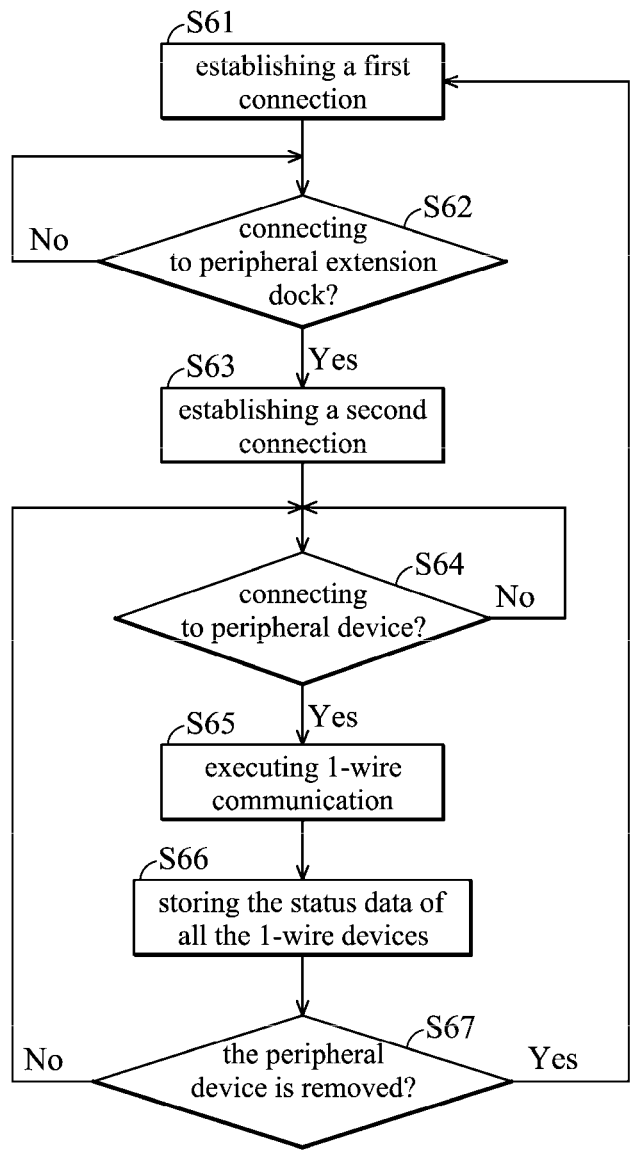
FIG. 6 is a flow chart of a detection and communication method for a peripheral device according to an embodiment of the invention.

FIG. 6 is a flow chart of a detection and communication method for a peripheral device according to an embodiment of the invention. The method of the embodiment reduces the power consumption of the portable device having 1-wire communication. The conventional portable device continuously polls the peripheral device to check whether a 1-wire peripheral device is connected thereto. The method of the embodiment executes 1-wire communication only when a 1-wire peripheral device is detected. In the step S21, the peripheral device establishes a first connection to the portable device via a peripheral extension dock. Reference to the connection between the nodes A and B0 in FIG. 4 can be made for an example of the first connection. Simply speaking, the first connection is a connection between a detector or a detection device of the portable device and a connector of the portable device. In the step S62, the portable device detects whether the peripheral extension dock exists? If not, the procedure stays at the step S62. If yes, the step S63 is executed to establish a second connection and cut the first connection. Reference to the connection between the nodes A and B1 in FIG. 4 can be made for an example of the second connection. Simply speaking, the second connection is a connection between the 1-wire master of the portable device and the connector of the portable device.

In the step S64, the portable device detects whether a peripheral device is connected to the peripheral extension dock. In this embodiment, when the peripheral device is connected to the peripheral extension dock, the peripheral extension dock transmits an interrupt signal to the portable device. If no peripheral device is connected to the peripheral extension dock, the procedure stays at the step S64. If at least one peripheral device is connected to the peripheral extension dock, the step S65 is executed. In the step S65, the portable device executes 1-wire communication with the 1-wire authentication controller of the peripheral device via the second connection. In the step S66, the portable device stores the status data of all the 1-wire devices connected to the peripheral extension dock. In another embodiment, the portable device stores the status data of all the peripheral devices connected to the peripheral extension dock. In the step S67, the portable device detects whether the peripheral device has been removed? If yes, the step S61 is executed. If not, the step S64 is executed.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a housing;
a connector port embedded in the housing, electrically connecting to a peripheral device inserted therein;
a processor comprising a detection pin and a 1-wire pin, electrically connected to the connector port; and
a switching device coupled between the connector port and the processor, selectively connecting the connector port to one of the detection pin or the 1-wire pin,
wherein when the peripheral device is inserted into the connector port, the processor controls the switching device to connect the connector port to the detection pin to determine whether the connected peripheral device is a 1-wire device, and
wherein when the processor determines that the connected peripheral device is a 1-wire device, the processor controls the switching device to connect the connector port to the 1-wire pin and the processor executes 1-wire communication with the peripheral device via the 1-wire pin.

2. The device as claimed in claim 1, wherein when the 1-wire communication is finished, the processor controls the switching device to connect the connector port to the detection pin.

3. The device as claimed in claim 1, wherein the peripheral device comprises a connector, and the size of the connector is compatible with the connector port, and wherein the peripheral device is electrically connected to the electronic device via the connector.

4. The device as claimed in claim 1, wherein the switching device comprises:
a first terminal coupled to a first pin of the connector port;
a second terminal coupled to the 1-wire pin; and
a third terminal coupled to the detection pin.

5. The device as claimed in claim 1, wherein the detection pin is a general purpose input/output pin, and the detection pin is coupled to a voltage source via a first resistor, and when a voltage level of the detection pin is pulled down to a low voltage level, the processor determines that the peripheral device is connected to the electronic device.

6. The device as claimed in claim 4, wherein the connector port is a micro USB connection port and the first pin is an identification pin of the micro USB connection port.

7. The device as claimed in claim 1, further comprising a storage device storing a plurality of codes, wherein when the 1-wire communication is finished, the processor compares identification data received via the 1-wire communication with the plurality of codes to identify the peripheral device or store a status of the peripheral device.

* * * * *